United States Patent
Bhavith (10) Patent No.: US 9,075,758 B2
(45) Date of Patent: Jul. 7, 2015

(54) REMOVABLE STORAGE DEVICE WITH TRANSACTIONAL OPERATION SUPPORT AND SYSTEM INCLUDING SAME

(71) Applicant: SAMSUNG ELECTRONICS CO., LTD., Suwon-Si, Gyeonggi-Do (KR)

(72) Inventor: Manathanathu Pushakara Bhavith, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 251 days.

(21) Appl. No.: 13/798,947

(22) Filed: Mar. 13, 2013

(65) Prior Publication Data

US 2013/0246364 A1   Sep. 19, 2013

(30) Foreign Application Priority Data

Mar. 19, 2012 (IN) .......................... 1005/CHE/2012
Oct. 17, 2012 (KR) ........................ 10-2012-0115531

(51) Int. Cl.
  *G06F 11/14*   (2006.01)
  *G06F 9/46*    (2006.01)

(52) U.S. Cl.
  CPC ............ *G06F 11/1471* (2013.01); *G06F 9/466* (2013.01)

(58) Field of Classification Search
  CPC .............................. G06F 11/1471; G06F 9/466
  USPC .................................................. 707/678, 703
  See application file for complete search history.

(56) References Cited

U.S. PATENT DOCUMENTS

| | | | |
|---|---|---|---|
| 7,340,647 B2 | 3/2008 | Aasheim et al. | |
| 7,350,105 B2 | 3/2008 | Aasheim et al. | |
| 7,363,540 B2 * | 4/2008 | Patel et al. | ...... 714/19 |
| 7,913,030 B2 | 3/2011 | Perry et al. | |
| 8,082,344 B2 * | 12/2011 | Doty et al. | .... 709/226 |
| 8,452,734 B2 * | 5/2013 | Munegowda et al. | ...... 707/672 |
| 8,762,347 B1 * | 6/2014 | Gokhale et al. | ...... 707/682 |
| 2009/0287874 A1 | 11/2009 | Rogers et al. | |
| 2009/0327295 A1 * | 12/2009 | Bovee et al. | .... 707/9 |
| 2010/0280995 A1 | 11/2010 | Munegowda et al. | |
| 2011/0082963 A1 | 4/2011 | Jeddeloh | |

FOREIGN PATENT DOCUMENTS

| | | |
|---|---|---|
| KR | 10-0390853 A | 7/2003 |
| KR | 1020070096420 A | 10/2007 |
| KR | 100857036 B1 | 9/2008 |
| KR | 1020110032343 A | 3/2011 |

* cited by examiner

*Primary Examiner* — Cheryl Lewis
(74) *Attorney, Agent, or Firm* — Volentine & Whitt, PLLC

(57) ABSTRACT

A removable storage device operates in accordance with transactions defined by a connected host. The removable storage device includes an input unit receiving metadata update operation(s) and log file information, a log information storage storing the log file information, and a transaction manager controlling execution of the metadata update operation(s) and execution of a recovery operation for the transaction following a failure event interrupting the transaction in accordance with the stored log file information.

20 Claims, 10 Drawing Sheets

Before transaction recovery

Original metadata sector

| LBA | PBA |
|-----|-----|
| 100 | 1000 |
| .... | .... |
| 200 | 1100 |
| .... | .... |
| 1000 | 10000 |

Log sector

After commit

| LBA | PBA |
|-----|-----|
| 100 | 10000 |
| .... | .... |
| 200 | 1100 |
| .... | .... |
| 1000 | |

LBA: Logical Block Address
PBA: Physical Block Address

REMOVABLE STORAGE DEVICE WITH TRANSACTIONAL OPERATION SUPPORT AND SYSTEM INCLUDING SAME

CROSS-REFERENCE TO RELATED APPLICATIONS

A claim of priority is made to Indian Patent Application No. 1005/CHE/2012 filed on Mar. 19, 2012, and to Korean Patent Application No. 10-2012-0115531 filed on Oct. 17, 2012.

BACKGROUND

The present inventive concept relates to removable storage devices and systems including same. As the name implies, removable storage devices may be repeatedly installed in and/or disconnected from a host system. Given this hardware configuration, a specialty piece of software (and/or corresponding firmware) called "a file system" that runs on a processor or central processing unit of the host system is responsible for the organization and configuration of data and data files stored by the removable storage device. A great variety of file systems are understood by those skilled in the art, but are generally used to perform a variety of operations such as; data file creation, data file indexing, data write, data read, data erase, data consolidation, etc. One or more "drivers" are also resident in the host system and are used in conjunction with the file system to perform (e.g.) read/write operations in relation to a removable storage device.

During periods of time in which the removable storage device is performing one or more operations, the host may be disconnected, a power supply may be interrupted, or some other error condition may be experienced. As a result such "failure events" (i.e., a condition intentionally or unintentionally interrupting the execution of an ongoing storage device operation), one or more errors may arise in the data being stored in or retrieved from the removable storage device. Additionally, a failure event may result in the corruption of file system information.

For example, most file systems use metadata to organize, identify and track data as it is stored, updated, and read from a removable storage device. As part of (or in response to) the execution of removable storage device operations, it is necessary to update metadata reference by the file system. And it is certainly possible that the interruption of the execution of a particular operation may result in the non-update, or partially updated of metadata.

Hence, it is necessary to provide data and file system information correction and/or protection mechanism(s) to ensure the reliability and enhance the operational robustness of removable storage devices.

SUMMARY

Embodiments of the inventive concept provide removable storage devices having improved operation reliability and enhanced robustness. Embodiments of the inventive concept also provide systems incorporating such removable storage devices.

In one embodiment, the inventive concept provides a removable storage device that receives a command from a connected host indicating a transaction to be executed by the removable storage device, the device comprising; an input unit that receives at least one metadata update operation and corresponding log file information associated with the transaction, a log information storage unit that stores the log file information before execution of the at least one metadata update operation, and a transaction manager that controls execution of the at least one metadata update operation in the removable storage device, and execution of a recovery operation for the transaction following a failure event interrupting the transaction in accordance with the log file information stored in the log information storage unit.

In another embodiment, the inventive concept provides a method of operating a removable storage device, comprising; receiving a command from a connected host indicating a transaction to be executed by the removable storage device, the command including at least one metadata update operation and corresponding log file information associated with the transaction, storing the log file information before execution of the at least one metadata update operation, and executing a recovery operation for the transaction following a failure event interrupting the transaction in accordance with the log file information stored in the log information storage unit.

In another embodiment, the inventive concept provides a data processing system, comprising a host and a removable storage device that receives a command from the host indicating a transaction to be executed by the removable storage device. The removable storage device comprises; an input unit that receives at least one metadata update operation and corresponding log file information associated with the transaction, a log information storage unit that stores the log file information before execution of the at least one metadata update operation, and a transaction manager that controls execution of the at least one metadata update operation in the removable storage device, and execution of a recovery operation for the transaction following a failure event interrupting the transaction in accordance with the log file information stored in the log information storage unit.

BRIEF DESCRIPTION OF THE DRAWINGS

The above and other aspects and features of the inventive concept will become more apparent upon consideration of certain embodiments with reference to the attached drawings, in which.

DETAILED DESCRIPTION

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to only the illustrated embodiments. Rather, these embodiments are provided so that this disclosure will be thorough and complete and will fully convey the concept of the inventive concept to those skilled in the art, and the inventive concept will only be defined by the appended claims. Throughout the written description and drawings, like reference numbers and labels are used to refer to like or similar elements.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the inventive concept.

The terminology used herein is for the purpose of describing particular embodiments only and is not intended to be limiting of the inventive concept. As used herein, the singular forms are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Robustness is a major consideration in the design and operation of contemporary removable storage devices. Robustness may be understood as a relative level of immunity to failure events and is a major factor in the overall reliability of data processing systems including a host and a removable storage device.

The overall reliability of conventional data processing systems incorporating embedded (or hardwired) storage devices has be enhanced by the use of transactions. A "transaction" is an operation executed by a data processing system that manipulates data or information related to data and includes a metadata update sub-operation. In its execution, a transaction must be atomic. That is, a transaction must be either fully executed, or not effectively executed at all. No partial execution of a transaction is possible.

To facilitate this type of operation, some contemporary file systems support transactions using some sort of transaction log. For example, metadata may be fully updated before execution of the transaction and the actually manipulation (e.g., writing) of data. Using this type of approach, a transaction interrupted (or disrupted) by a failure event may nonetheless be "recovered" by reference to information stored in the transaction log. For example, with reference to the transaction log it may be readily determined whether a transaction was completed before the failure event, or whether the transaction was interrupted and must be rolled back by a recovery operation.

The use of a transaction log has benefits beyond facilitating a recovery operation. For example, metadata updates need not be buffered during a transaction, and metadata may be written to the storage device only once after updating the transaction log. Unfortunately, conventional file systems implementing transactional operations (e.g., TFS4, BTFS, ext2/3 and NTFS) have only been applied to data processing systems including embedded (or hardwired) storage devices. Indeed, the safe removal option for USB drives operating in conjunction with certain Windows® operating systems is allowed for exactly the reason that transactional operations are not supported for removable storage devices.

Thus, some conventional file systems support transactional operations for embedded storage devise by logging metadata updates to (e.g.) a nonvolatile memory before writing data. Then, once the metadata has been logged, it need be updated one in memory only one time. And if the metadata update is interrupted by a failure event, the constituent transaction may be recovered upon re-boot of the data processing system by referring the transaction log.

Clearly, this approach cannot be applied to removable storage devices, since there is no guarantee that following a failure event interrupting a transaction, a particular removable storage device will ever be re-connected to the host experiencing the failure event. Further, a subsequently connected host may not be capable of operating in conjunction with the transaction log defined by the former host, and therefore the necessary recovery operation may not supported.

Figure 1A:
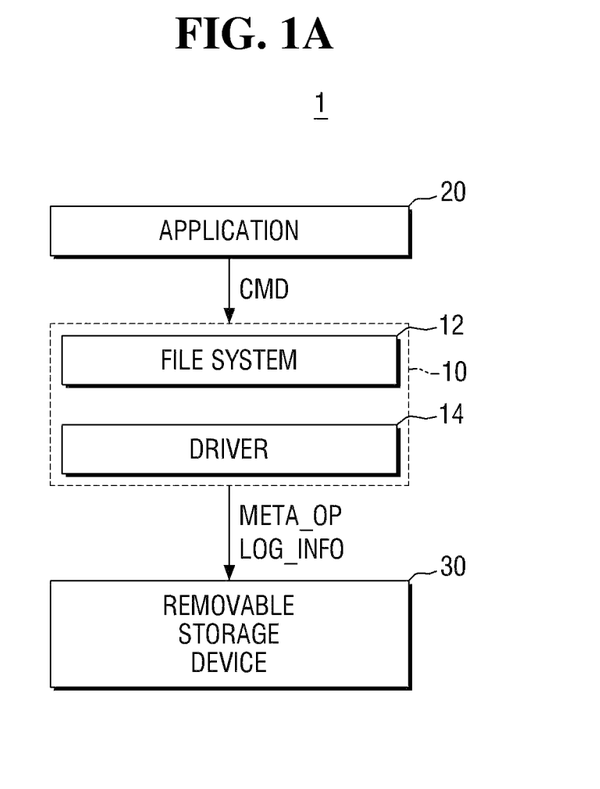
FIG. 1A is a block diagram of a system according to an embodiment of the inventive concept.
Figure 1B:
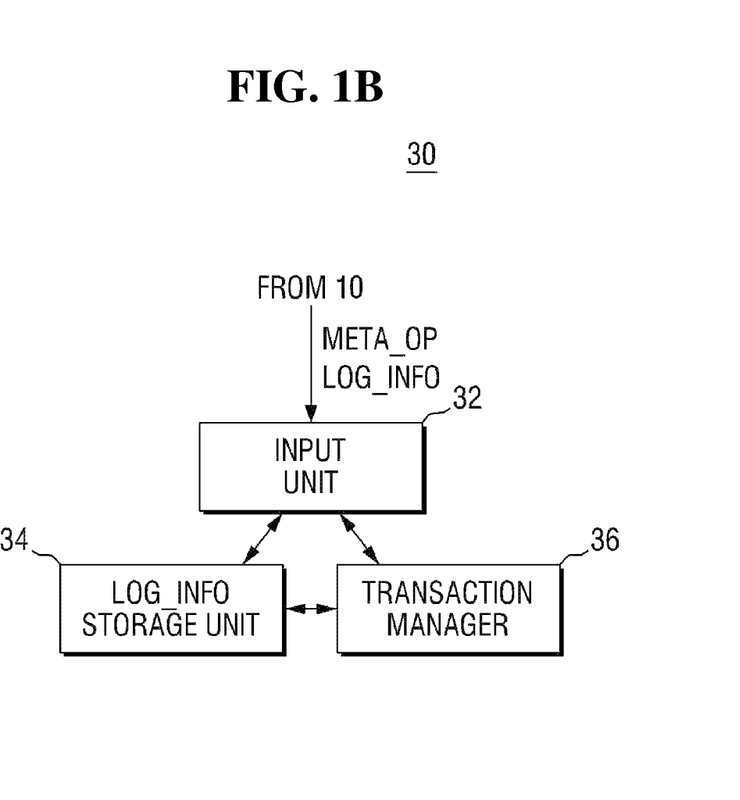
FIG. 1B is a block diagram further illustrating the removable storage device of FIG. 1A.

FIG. 1A is a block diagram of a data processing system 1 according to an embodiment of the inventive concept, and FIG. 1B is a block diagram further illustrating in one example the removable storage device 30 of FIG. 1A.

It is assumed that the system 1 and removable storage device 30 operate according to a given set of transactions. The term "transaction" denotes a unit of execution for the system 1 including one or more logical function(s) that manipulate data.

A transaction guarantees atomicity, consistency, isolation, and durability (ACID). Atomicity has been discussed above. Consistency means that the stored data is maintained in a consistent state upon completion of a successful transaction. Isolation means that intermediate operation results of a transaction are not accessible by other transactions or operations. Durability means that the results of a successful transaction will persist in the stored data until later changed by a succeeding transaction.

In certain embodiments, multiple operations may be subsumed within a single transaction. For example, if three operations are to be successively executed in the system 1 in response to a command, the execution of the three operations may be treated as a single transaction. Thus, the command is not deemed "executed" until each one the three operations is completed. If the transaction is interrupted by a failure event after only two of the three operations has been executed, the two (completed) operations must be rolled back during a subsequent recovery operation, and then the third operation executed.

Referring to FIG. 1A, the system 1 generally comprises an application 20 running on the host 10 and generating various commands (CMD) invoking data operations directed to the "installed" (or connected) removable storage device 30. As is conventionally understood, the host 10 may include a file system 12 and a driver 14.

The host 10 may be a desktop, laptop, camera, mobile phone or any other system including a micro processor or CPU, or a system capable of initiating a transaction using a constituent file system.

Thus, a command CMD generated by execution of the application 20 on the host 10 is received by the file system 12, and the file system 12 and driver 14 cooperate to define predetermined operation(s) responsive to the command. For example, when the application 20 sends a generate file command CMD instructing the host 10 to write data to a newly defined file 'A', the file system 12 and driver 14 may generate (e.g.) a write operation, a data update operation, and one or more metadata (e.g., a bitmap, a directory entry, and a file allocation table (FAT)) update operations (META_OP).

The metadata update operations META_OP will be processed as a transaction. The metadata update operations META_OP related to, e.g., the write operation, that is, a bitmap update operation, a directory entry update operation, and a FAT update operation may be processed as a transaction.

The metadata update operations META_OP included in a transaction may be identified by a transaction ID (T_id). In the above example, a bitmap update operation, a directory entry update operation, and a FAT update operation are three different operations identified by the same transaction ID (e.g., T_id=1).

The host 10 also generates log information (LOG_INFO) which includes information related to the metadata update(s).

The log information LOG_INFO may include the type of operation, the type of the metadata update, the location of metadata, the amount of change in the metadata, and/or information related to old metadata, etc. The type of operation may be, for example, create, rename, truncate or write, and the type of the metadata update may be, for example, a bitmap update, a directory entry update, or a FAT update. In addition, the information related to the old metadata may include not only the content of the old metadata but also the location of the old metadata.

Once a transaction is complete (that is, when one or more metadata update operations META_OP included in the transaction is complete), the host 10 generates a transaction end signal. In similar manner, the host 10 may generate a transaction start signal indicating the start of a transaction. The transaction start and transaction end signals may be indicated in any form (e.g., using a flag).

As the file system 12 generates one or more operations corresponding to the command CMD provided by the application 20, the driver 14 may assign an appropriate transaction ID T_id and generate corresponding log information LOG_INFO. However, the scope of the inventive concept is not limited to only this approach. For example, the assignment of a transaction ID T_id may be performed by the file system 12.

In certain embodiments of the inventive concept, the file system 12 may be, but is not limited to, TFS4, BTFS, ext2/3, or NTFS.

The removable storage device 10 executes the operations requested by the host 10. Ready examples of the removable storage device 30 include a detachable external hard disk, an SD card, an MMC, a UFS card, a UHS II card, or a USB mass storage device.

Referring to FIG. 1B, the removable storage device 30 comprises an input unit 32, a log_info storage unit 34, and a transaction manager 36.

In its operation, the removable storage device 30 stores the log information LOG_INFO and performs one or more metadata update operations included in a transaction. That is, the input unit 32 receives the log information LOG_INFO from the host 10, and the log_info storage unit 34 stores the log information LOG_INFO.

When a transaction is complete, the transaction manager 36 removes all log information LOG_INFO related to the completed transaction. Here, the removal of the log information LOG_INFO may be performed dependently or independently in relation to the host 10. In a case where the log information LOG_INFO is removed in a manner dependent upon the host 10, when a transaction is complete, the host 10 may provide a completion signal, and the removable storage device 30 (i.e., the transaction manager 36) may remove the log information LOG_INFO in response to the completion signal. This operation will be described in some additional detail hereafter with reference to FIG. 3.

However, if a transaction is interrupted by a failure event, the transaction manager 36 recovers the interrupted transaction using the stored log information LOG_INFO. Recovering an interrupted transaction may include rolling back or committing metadata related to the interrupted transaction. This operation will be described in some additional detail hereafter with reference to FIG. 4.

During a next subsequent power-up routine for the removable storage device 30, the transaction manager 36 may recover the interrupted transaction. For example, when the removable storage device 30 is again connected to a host 10, and not necessarily to the same host 10 experiencing the interrupting failure event, it executes a predetermined powered up routine. As part of this power-up routine, any previously interrupted transaction may be recovered.

For example, the transaction manager 36 may be used to detect the presence of undeleted log information LOG_INFO in the log_info storage unit 34, and upon detecting the presence of undeleted log information LOG_INFO, the transaction manager 36 may further cause execution of a recovery operation. The recovery operation invoked by the transaction manager 36 may be performed dependently or independently in relation to the host 10.

Figure 2:
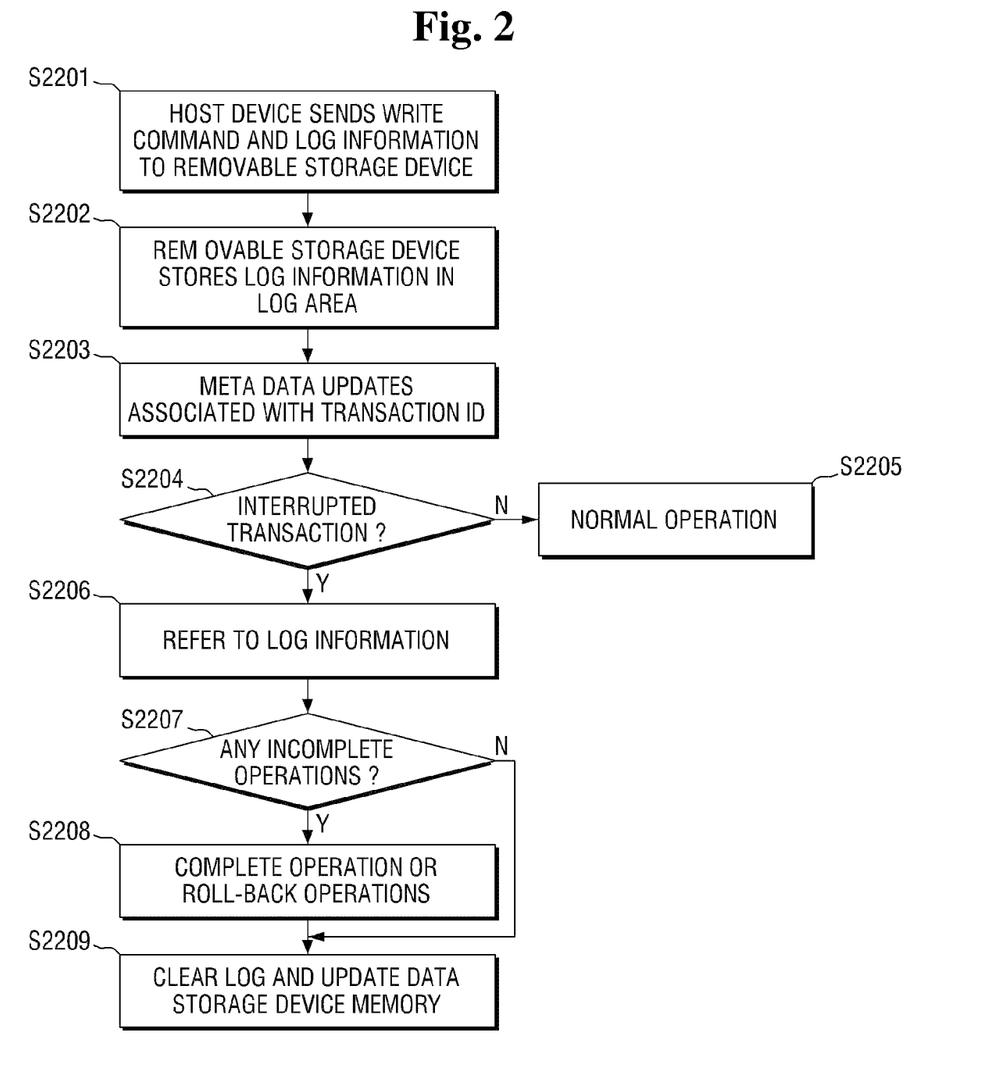
FIG. 2 is a flowchart summarizing a recovery method for a removable memory device in accordance with certain embodiments of the inventive concept.

FIG. 2 is a flowchart illustrating a method of executing a recovery operation within a removable storage device according to certain embodiments of the inventive concept. The illustrated method assumes a file system operating in a dependent mode. Hence the host creates the log file and sends the log file information to the removable memory device. The removable memory device is assumed have the computational capabilities necessary to interrupt the log file information and perform a defined recovery operation.

The recovery operation of FIG. 2 has its origins with a write command and corresponding log file information sent from the host 10 to the removable storage device 30 and initiating a transaction (S2201). The log file information will include "transaction information" including, for example, details such as: operation type (e.g., create, rename, truncate, write); metadata update type (e.g., bitmap update, FAT update); metadata location (e.g., a logical block address (LB) and/or index value within a LB); metadata changes; old metadata; etc. Those skilled in the art will understand that the foregoing is merely exemplary of many different transaction information designations that might be effectively used to complete a transaction or roll back it back during a recovery operation.

Upon receiving the log file information, the removable memory device stores same in a designated area of nonvolatile memory (i.e., a log area) within the removable storage device 30 before updating the relevant metadata in one or more area(s) designated for metadata storage (i.e., a metadata area) in the removable storage device 30 (S2202).

Once the log file information is stored in nonvolatile memory within the removable storage device, any metadata updates (e.g., directory entry, bitmap update and FAT update) associated with a current transaction ID are executed (S2203).

At this point following successful storage of the log file information, if the current transaction is interrupted before completion, the removable storage device 30 may interrogate log file and continue forward with metadata updates and execution of the constituent operations. If there are multiple metadata updates associated with a single file system defined transaction, then each metadata update is assigned the same transaction ID.

For example, it is assumed that a current transaction contains both a bitmap update and a FAT update. Following the bitmap update but before the FAT update, the current transaction is interrupted by a failure event. Subsequent to the failure event, it is assumed that the removable storage device 30 is re-initialized and executes a power-up routine.

Under these assumed conditions, transaction information remains stored in the log file of the removable storage device 30 upon power-up, and transaction information related to the interrupted transaction may be used to perform a recovery operation. This type of determination (S2204) may be routinely made upon power-up of the removable storage device 30.

Where no interrupted transaction is detected (S2204=No), the data processing system 1 proceeds with normal operation (S2205). However, if an interrupted transaction is detected (S2204=Yes), the data processing system 1 must execute a recovery operation for the removable storage device 30 by referencing the log file (S2206). Resort to the log file and related data entries in the removable storage device 30 allow a determination to be made as to whether any incomplete (un-executed) operations associated with the interrupted transaction are indicated (S2207). If there are no incomplete operations indicated (S2207=No), the log file is cleared of transaction information related to the interrupted transaction following required updates (if any) to the memory space of the removable storage device (S2209).

However, if there are incomplete operations indicated (S2207=Yes), certain incomplete operations may be immediately completed according to the stored transaction information, while other incomplete operations may require a roll-back of other (completed) operations indicated by a same transaction ID associated with the incomplete operation (S2208). Following completion of any incomplete operations associated with the interrupted transaction, the log file is cleared of transaction information related to the interrupted transaction following required updates (if any) to the memory space of the removable storage device (S2209).

Figure 3:
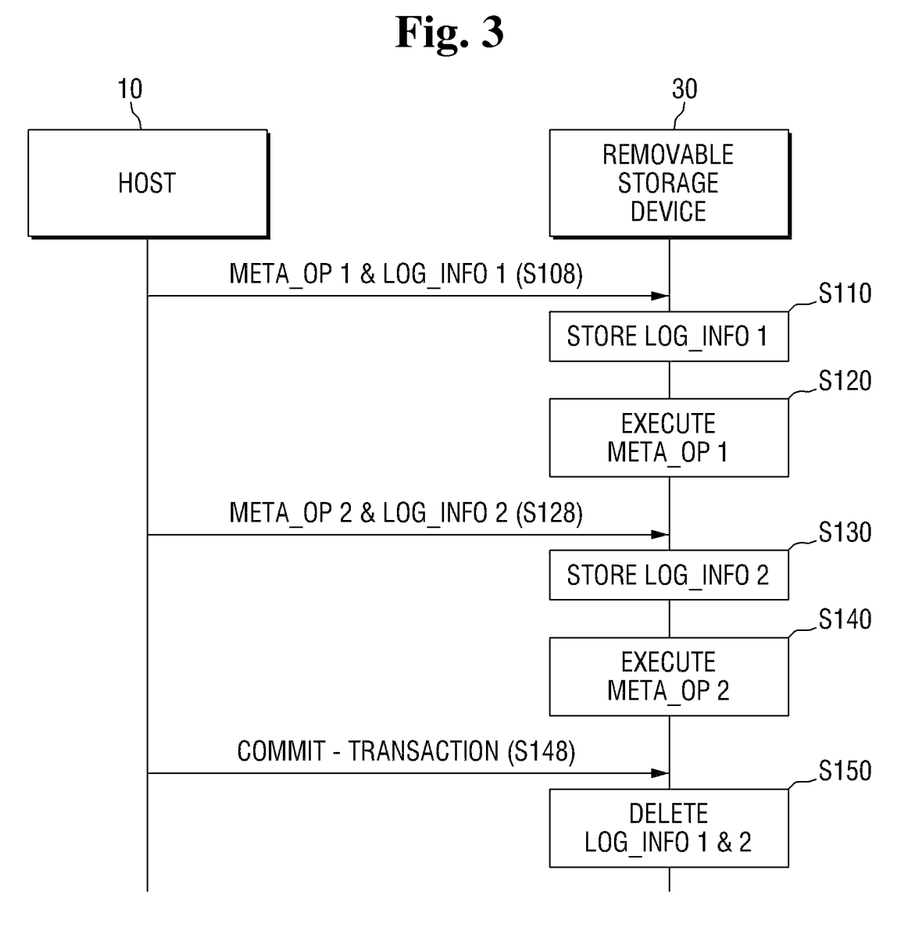
FIGS. 3, 4, 5 and 6 are flowcharts respectively summarizing various operating methods for the system of FIG. 1A.

FIG. 3 is a flowchart illustrating one method of operating the system 1 of FIG. 1A. In FIG. 3, a case is illustrated wherein a transaction is completed without interruption.

Referring to FIG. 3, the host 10 instructs the removable storage device 30 to execute a first metadata update operation META_OP1 associated with a current transaction, and accordingly provide first log information LOG_INFO1 corresponding to the first metadata update operation META_OP1 (S108).

The removable storage device 30 stores the first log information LOG_INFO1 (S110). Then, the removable storage device 30 executes the first metadata update operation META_OP1 (S120).

Then, the host 10 instructs the removable storage device 30 to execute a second metadata update operation META_OP2 included in the current transaction and provides second log information LOG_INFO2 corresponding to the second metadata update operation META_OP2 (S128). In response, the removable storage device 30 stores the second log information LOG_INFO2 (S130), and executes the second metadata update operation META_OP2 (S140).

When both of the metadata update operations (META_OP1 and MET_OP2) associated with the current transaction are complete, the host 10 transmits a completion signal (COMMIT_TRANSACTION) to the removable storage device 30 (S148).

In response, the removable storage device 30 may delete all log information (LOG_INFO1 and LOG_INFO2) corresponding to the completed transaction from its log file (S150).

Figure 4:
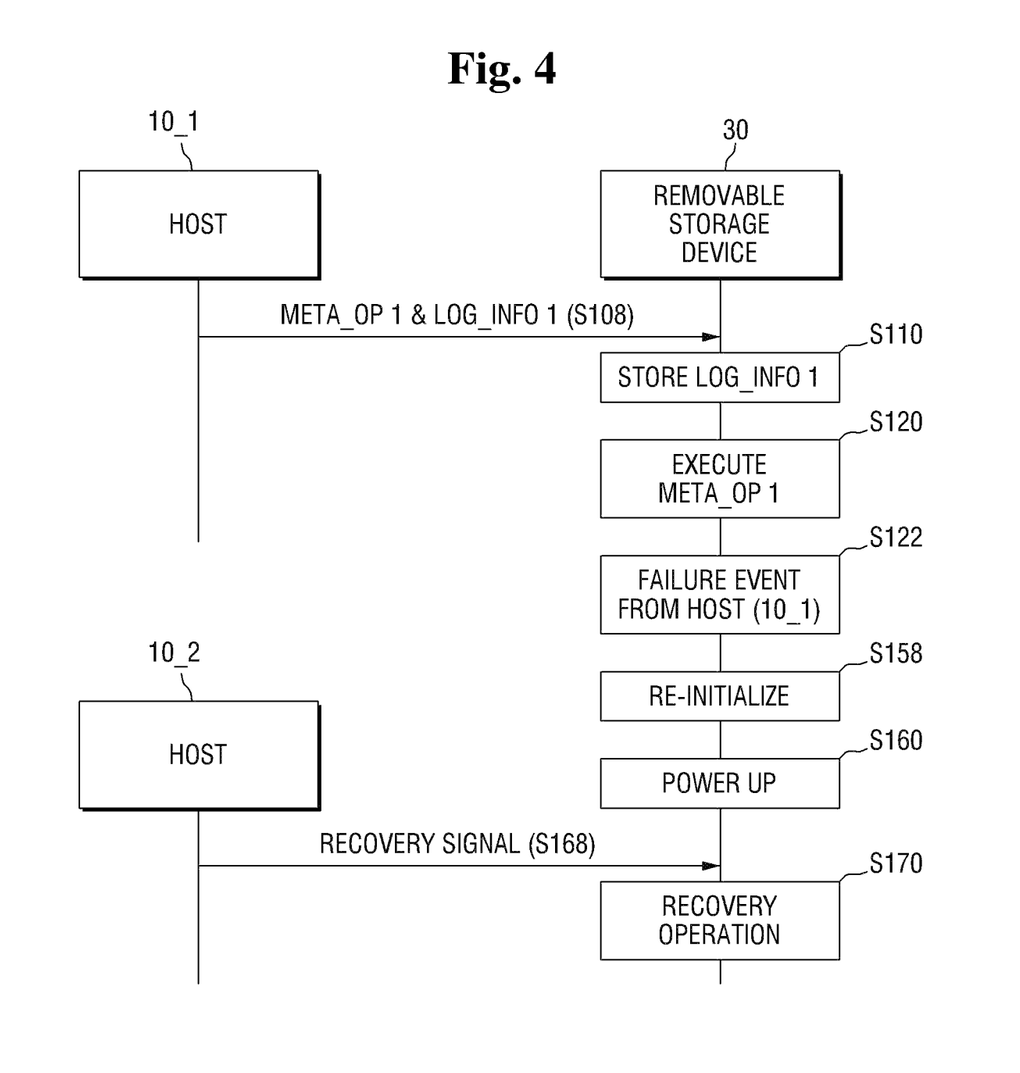

By way of comparison, the flowchart of FIG. 4 illustrates an example wherein a transaction is interrupted during execution.

Referring to FIG. 4, a host 10_1 instructs the removable storage device 30 to perform a first metadata update operation META_OP1 included in a current transaction and provides first log information LOG_INFO1 corresponding to the first metadata update operation META_OP1 (S108). In response, the removable storage device 30 stores the first log information LOG_INFO1 (S110), and executes the first metadata update operation META_OP1 (S120).

The removable storage device 30 has not yet executed all metadata updates included in the current transaction when a failure event occurs (S122).

Subsequently, the removable storage device 30 is reinitialized upon being reconnected to a second host 10_2, possibly different from the first host 10_1 (S158). Upon re-initialization by connection to the second host 10_2, the removable storage device 30 is powered-up (S160). During a power-up routine the removable storage device and/or the second host 10_2 detects the interrupted transaction. Accordingly, the second host 10_2 provides a recovery signal to the removable storage device 30 (S168). Upon receiving the recovery signal, the removable storage device 30 interrogate the stored log information LOG_INFO1, and executes a recovery operation (S170) in response to the stored log information LOG_INFO1.

In other embodiments of the inventive concept, the removable storage device 30 need not wait upon a recovery signal provide by a host. Instead, it may interrogate the stored log information LOG_INFO independent of any control from the host and execute a recovery operation, as necessary.

Since data processing systems including removable storage devices according to embodiments of the inventive concept adopt the transactional operations, failure events do not cause file system errors related to interrupted transactions executed by the removable storage device. This improves operational reliability and robustness.

The above-described operating methods may be applied to any host including a file system and related driver(s), if any, as modified to support transactional operations using a log file resident in a removable storage device and further modified to provide transaction IDs.

Hereinafter, a case wherein two or more applications running on a host request that respective transactions be executed by a removable storage device will be described with reference to FIGS. 7 and 8.

Figure 5:
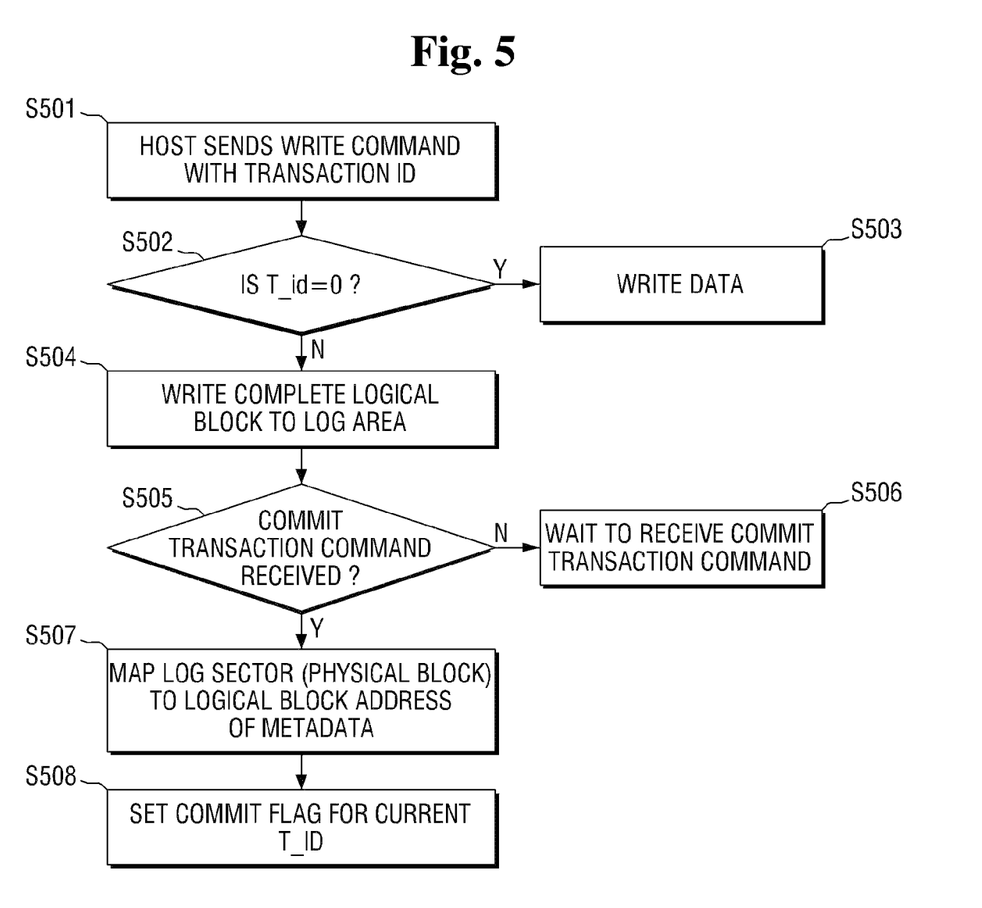

FIG. 5 illustrates another method of executing a transaction recovery operation according to certain embodiments of the inventive concept. Following data processing systems 1 power-up, the host 10 sends a write command along with transaction id (S501) to the removable storage device 30. The removable storage device or host then determines whether the transaction id is zero (T_id=0) (S502). If the transaction id is zero (S502=Yes), no logging is required which implies transaction support is not required for this particular operation (e.g. data write), and the data processing system 1 may merely write data to the removable storage device (S503). However, if the transaction is not zero (S502=No), then the data processing system writes a complete logical block (LB) to the log area (S504). Once the data processing system determines (S505) whether the transaction is complete which implies any commit transaction command received. If there is no commit transaction command received then the system waits (S506) to receive commit transaction command. If the commit transaction is received then the system maps (S507) log sector (physical block address) to logical block address of metadata. Then the system sets (S508) commit flag for the current transaction id (T_id). In certain embodiments, the log file or log area has the physical block address (PBA) of 10000 and contains the transaction information in it. During a recovery operation, the new physical block address (PBA) is mapped with the logical block address (LBA) and the system removes the PBA mapped to the LBA.

Figure 6:
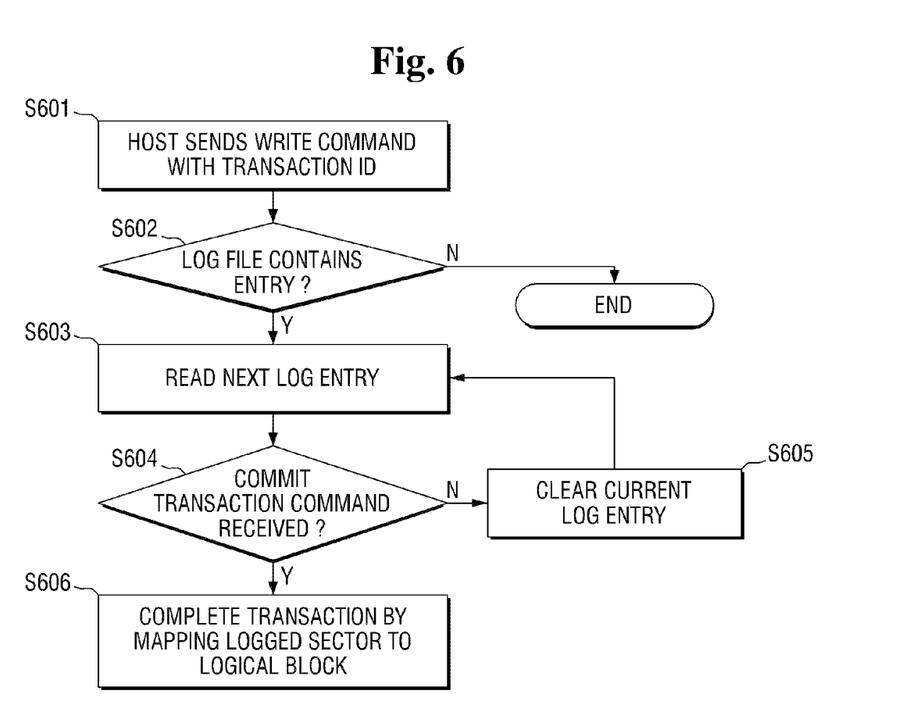

FIG. 6 illustrates the recovery operation for an incomplete transaction during an initialization period for the removable storage device according to certain embodiments of the inventive concept. The removable storage device 30 is initialized upon power up or reset. The removable memory device may be connected to a previously connected host or a different host following a failure event.

In the operating method, the storage device is initialized following a failure event (S601). The date processing system then determines whether the log file contains an entry (S602). If the log file contains no entry (S602=No), the method ends. However, if the log file contains an entry, then the data processing system reads the next log entry (S603), and determines whether a commit transaction flag is set (S604). If the commit transaction flag is not set (S604=No), then the current log entry is cleared (S605). However, if the commit transaction flag is set, then the interrupted transaction is completed by mapping the logged sector (physical block address) to a corresponding logical block address and executing a recovery operation (S606).

Figure 7:
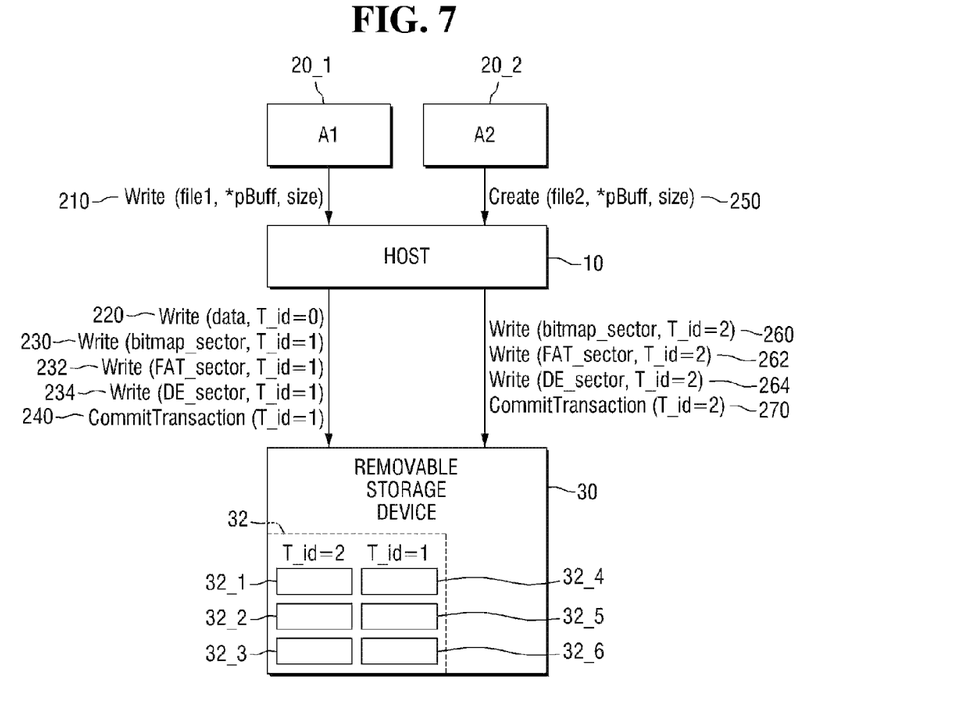
FIGS. 7 and 8 are block diagrams of systems according to certain embodiments of the inventive concept.
Figure 8:
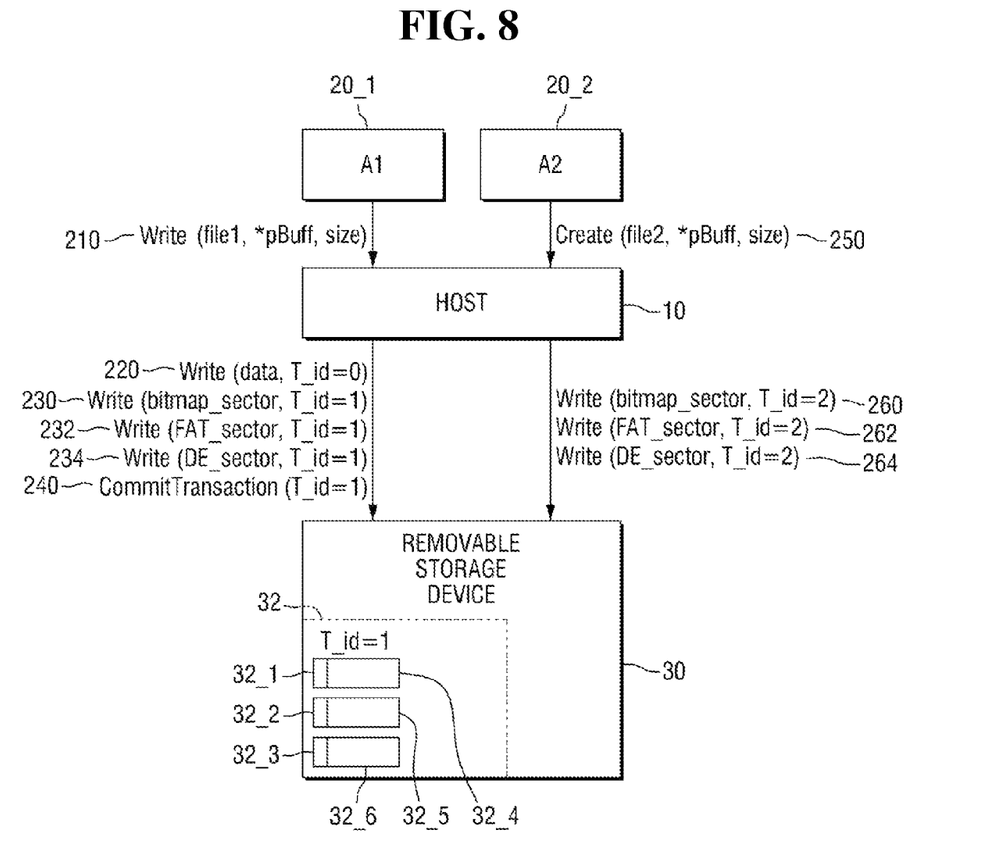

FIGS. 7 and 8 are block diagrams illustrating systems according to certain embodiments of the inventive concept.

Referring to FIG. 7, a first application 20_1 provides a write command, for example, write (file1, *pBuff, size) 210 to a host 10.

The host 10 instructs a removable storage device 30 to perform a data update operation, for example, a write (data, T_id=0) operation 220. Here, a transaction ID T_id of zero indicates that no transaction exists.

A second application 20_2 provides a file creation command, for example, create (file2, *pBuff, size) 250 to the host 10.

Then, the host 10 instructs the removable storage device 30 to perform a metadata update operation corresponding to the file creation command, for example, a write (bitmap_sector, T_id=2) operation 260. Here, it can be understood that the transaction ID T_id is two and that a second transaction has started. The host 10 generates log information 32_1 related to the write (bitmap_sector, T_id=2) operation 260 and provides the generated log information 32_1 to the removable storage device 30. Accordingly, the log information 32_1 is stored in a log region 32 (i.e., a region corresponding to T_id=2) of the removable storage device 30. The removable storage device 30 performs the bitmap update.

The host 10 instructs the removable storage device 30 to perform a write (FAT_sector, T_id=2) operation 262. The host 10 generates log information 32_2 related to the write (FAT_sector, T_id=2) operation 262 and provides the generated log information 32_2 to the removable storage device 30. Accordingly, the log information 32_2 is stored in the log region 32 (i.e., the region corresponding to T_id=2) of the removable storage device 30. The removable storage device 30 performs the FAT update.

The host 10 instructs the removable storage device 30 to perform a write (DE_sector, T_id=2) operation 264. The host 10 generates log information 32_3 related to the write (DE_sector, T_id=2) operation 264 and provides the generated log information 32_3 to the removable storage device 30. Accordingly, the log information 32_3 is stored in the log region 32 (i.e., the region corresponding to T_id=2) of the removable storage device 30. The removable storage device 30 performs the directory entry update.

The host 10 instructs the removable storage device 30 to perform a metadata update operation corresponding to the write command, for example, a write (bitmap_sector, T_id=1) operation 230. Here, it can be understood that the transaction ID T_id is one and that a first transaction has started. The host 10 generates log information 32_4 related to the write (bitmap_sector, T_id=1) operation 230 and provides the generated log information 32_4 to the removable storage device 30. Accordingly, the log information 32_4 is stored in the log region (i.e., a region corresponding to T_id=1) of the removable storage device 30. The removable storage device 30 performs the bitmap update.

The host 10 instructs the removable storage device 30 to perform a write (FAT_sector, T_id=1) operation 232. The host 10 generates log information 32_5 related to the write (FAT_sector, T_id=1) operation 232 and provides the generated log information 32_5 to the removable storage device 30. Accordingly, the log information 32_5 is stored in the log region 32 (i.e., the region corresponding to T_id=1) of the removable storage device 30. The removable storage device 30 performs the FAT update.

The host 10 instructs the removable storage device 30 to perform a write (DE_sector, T_id=1) operation 234. The host 10 generates log information 32_6 related to the write (DE_sector, T_id=1) operation 234 and provides the log information 32_6 to the removable storage device 30. Accordingly, the log information 32_6 is stored in the log region 32 (i.e., the region corresponding to T_id=1) of the removable storage device 30. The removable storage device 30 performs the directory entry update.

The host 10 provides a transaction completion signal CommitTransaction (T_id=2) 270. Accordingly, the removable storage device 30 removes all of the log information 32_1 through 32_3 related to the second transaction, that is, the log information 32_1 through 32_3 corresponding to metadata update operations having T_id=2.

In addition, the host 10 provides a transaction completion signal CommitTransaction (T_id=1) 240. Accordingly, the removable storage device 30 removes all of the log information 32_4 through 32_6 related to the first transaction, that is, the log information 32_4 through 32_6 corresponding to metadata update operations having T_id=1.

In summary, the first application 20_1 sends a first operation command to a file system 12, and the host 10 assigns a first transaction ID T_id=1 to operations related to the first operation command. After all operations related to the first operation command are completed, all log information 32_4 through 32_6 related to the operations that correspond to the first operation command is removed.

In addition, the second application 20_2 sends a second operation command to the file system 12, and the host 10 assigns a second transaction ID T_id=2, which is different from the first transaction ID T_id=1, to operations related to the second operation command. After all operations related to the second operation command are completed, all log information 32_1 through 32_3 related to the operations that correspond to the second operation command is removed.

In a data processing system according to certain embodiments of the inventive concept, there is no separate LOG_INFO sending to removable storage device 30. Device log the complete data/metadata block in the media, and will be moved (by mapping the logged physical block to actual logical block) to the actual area only after the commit transaction signal is received.

FIG. 5 illustrated a case wherein one transactional operation contains one independent file operation (e.g., a write operation to file1 and creating file2). Here both operations do not have a common metadata block. So, we can have two independent and unique transaction ids (id=1, id=2) associated with two independent transactions.

In FIG. 6, both file operations involve updating the same metadata block, so both transactions must be related and be identified by the same transaction id.

In FIG. 8, even when first and second applications 20_1 and 20_2 send first and second operation commands, a host 10 may integrate the first and second operation commands into one transaction. To integrate the first and second operation commands into one transaction, the host 10 assigns the same transaction ID (e.g., T_id=1) to operations related to the first and second operation commands.

Specifically, referring to FIG. 8, the first application 20_1 provides a write command, for example, write (file1, *pBuff, size) 210 to a host 10. The host 10 instructs a removable storage device 30 to perform a data update operation, for example, a write (data, T_id=0) operation 220.

The second application 20_2 provides a file creation command, for example, create (file2, *pBuff, size) 250 to the host 10.

The host 10 instructs the removable storage device 30 to perform a metadata update operation corresponding to the file creation command, for example, a write (bitmap_sector, T_id=1) operation 260. Here, it can be understood that the transaction ID T_id is one and that a first transaction has started. The host 10 generates log information 32_1 related to the write (bitmap_sector, T_id=1) operation 261 and provides the generated log information 32_1 to the removable storage device 30. Accordingly, the log information 32_1 is stored in a log region 32 (i.e., a region corresponding to T_id=1) of the removable storage device 30. The removable storage device 30 performs the bitmap update.

The host 10 instructs the removable storage device 30 to perform a write (FAT_sector, T_id=1) operation 262. The host 10 generates log information 32_2 related to the write (FAT_sector, T_id=1) operation 263 and provides the generated log information 32_2 to the removable storage device 30. Accordingly, the log information 32_2 is stored in the log region 32 (i.e., the region corresponding to T_id=1) of the removable storage device 30. The removable storage device 30 performs the FAT update.

The host 10 instructs the removable storage device 30 to perform a write (DE_sector, T_id=1) operation 264. The host 10 generates log information 32_3 related to the write (DE_sector, T_id=1) operation 265 and provides the generated log information 32_3 to the removable storage device 30. Accordingly, the log information 32_3 is stored in the log region 32 (i.e., the region corresponding to T_id=1) of the removable storage device 30. The removable storage device 30 performs the directory entry update.

The host 10 instructs the removable storage device 30 to perform a metadata update operation corresponding to the write command, for example, a write (bitmap_sector, T_id=1) operation 230. The host 10 generates log information 32_4 related to the write (bitmap_sector, T_id=1) operation 230 and provides the generated log information 32_4 to the removable storage device 30. Accordingly, the log information 32_4 is stored in the log region 32 (i.e., the region corresponding to T_id=1) of the removable storage device 30. The removable storage device 30 performs the bitmap update.

The host 10 instructs the removable storage device 30 to perform a write (FAT_sector, T_id=1) operation 232. The host 10 generates log information 32_5 related to the write (FAT_sector, T_id=1) operation 232 and provides the generated log information 32_5 to the removable storage device 30. Accordingly, the log information 32_5 is stored in the log region 32 (i.e., the region corresponding to T_id=1) of the removable storage device 30. The removable storage device 30 performs the FAT update.

The host 10 instructs the removable storage device 30 to perform a write (DE_sector, T_id=1) operation 234. The host 10 generates log information 32_6 related to the write (DE_sector, T_id=1) operation 234 and provides the generated log information 32_6 to the removable storage device 30. Accordingly, the log information 32_6 is stored in the log region 32 (i.e., the region corresponding to T_id=1) of the removable storage device 30. The removable storage device 30 performs the directory entry update.

The host 10 provides a transaction completion signal CommitTransaction (T_id=1) 240. Accordingly, the removable storage device 30 removes all of the log information 32_1 through 32_6 related to the first transaction, that is, the log information 32_1 through 32_6 corresponding to metadata update operations having T_id=1.

In summary, the host 10 assigns one transaction ID (T_id=1) to operations related to the first and second operation commands issued by the first and second applications 20_1 and 20_2. After all operations related to the first and second operation commands are completed, all log information 32_1 through 32_6 related to the operations that correspond to the first and second operation commands is removed.

Figure 9:
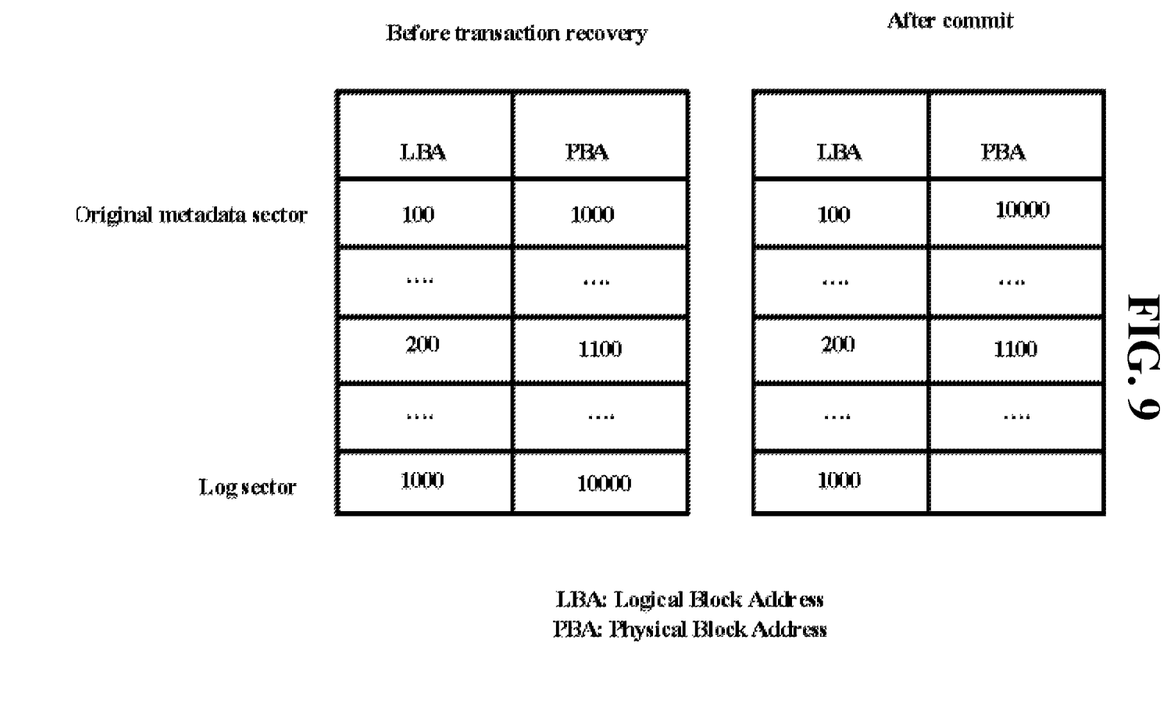
FIG. 9 is a conceptual diagram illustrating log file mapping between LBA and PBA before and after transaction execution.

FIG. 9 is a conceptual diagram illustrating one example of a log file mapping for logical block addresses (LBA) and physical block addresses (PBA) before and after transaction completion. In the illustrated example, instead of logging the transaction information according to the method in FIG. 2, the transaction information may also be represented in the form of metadata sector and this information may be logged. This makes the process of recovery simple as during the recovery the log sector may be remapped with the actual metadata sector. Thus, FIG. 9 illustrates LBA and PBA table mappings. The tables show an original metadata sector and the log sector before transaction recovery and after transaction recovery. When a failure event occurs, the table is retained in the log file. Further, when the removable storage device again powers up, it is able to recover the metadata mapping directly from the log file by just remapping the PBA to LBA.

In certain embodiments, the log file consistent with FIG. 9 indicates a commit transaction. The commit mechanism may be implementation specific. For example, the remapping LBA-PBA table may be performed during a commit transaction. The transaction information may also be logged in the form of metadata sector. This makes the process of recovery simple as during the recovery the log sector is remapped with the actual metadata sector.

While the present inventive concept has been particularly shown and described with reference to exemplary embodiments thereof, it will be understood by those of ordinary skill in the art that various changes in form and detail may be made therein without departing from the scope of the present inventive concept as defined by the following claims. The exemplary embodiments should be considered in a descriptive sense only and not for purposes of limitation.

What is claimed is:

1. A removable storage device ("the device") that receives a command from a connected host indicating a transaction to be executed by the removable storage device, the device comprising:
an input unit that receives at least one metadata update operation and corresponding log file information associated with the transaction;
a log information storage unit that stores the log file information before execution of the at least one metadata update operation; and
a transaction manager that controls execution of the at least one metadata update operation in the removable storage device, and execution of a recovery operation for the transaction following a failure event interrupting the transaction in accordance with the log file information stored in the log information storage unit.

2. The device of claim 1, wherein the recovery operation comprises at least one of rolling back or committing metadata indicated by the at least one metadata update operation.

3. The device of claim 1, wherein the at least one metadata update operation comprises a first metadata update operation and first log file information communicated from the host by a first metadata update instruction signal, and a second metadata update operation and second log file information communicated from the host by a second metadata update instruction signal.

4. The device of claim 3, wherein the transaction manager sequentially controls execution of the first metadata update operation in response to the first metadata update instruction signal, and execution of the second metadata update operation in response to the second metadata update instruction signal.

5. The device of claim 1, wherein upon completion of the transaction, the transaction manager controls deletion of the log file information from the log information storage unit.

6. The device of claim 5, wherein the transaction manager deletes the log file information in response to a completion signal provided by the host.

7. The device of claim 1, wherein the transaction manager controls execution of the recovery operation for the transaction following the failure event during a next power-up of the device.

8. The device of claim 7, wherein the transaction manager determines whether or not the recovery operation is necessary by referencing log file information stored in the log information storage unit.

9. The device of claim 1, wherein each one of the at least one metadata update operations is identified by a same transaction identification (ID).

10. The device of claim 1, wherein the log file information comprises at least one of operation type, metadata update type, metadata location, changes to stored metadata, and old metadata previously stored in the device.

11. A method of operating a removable storage device, comprising:
receiving a command from a connected host indicating a transaction to be executed by the removable storage device, the command including at least one metadata update operation and corresponding log file information associated with the transaction;
storing the log file information before execution of the at least one metadata update operation; and
executing a recovery operation for the transaction following a failure event interrupting the transaction in accordance with the log file information stored in the log information storage unit.

12. The method of claim 11, wherein executing the recovery operation comprises at least one of rolling back or committing metadata indicated by the at least one metadata update operation.

13. The method of claim 11, wherein receiving the command from the host comprises:
receiving a first metadata update operation and first log file information communicated from the host by a first metadata update instruction signal; and
receiving a second metadata update operation and second log file information communicated from the host by a second metadata update instruction signal.

14. The method of claim 11, further comprising:
upon completion of the transaction, deleting the stored log file information.

15. The method of claim 14, further comprising:
receiving a completion signal from the host; and
deleting the log file information only in response to the completion signal.

16. The method of claim 1, wherein the recovery operation is executed for the transaction following the failure event during a next power-up of the storage device.

17. The method of claim 16, further comprising:
determining whether or not the recovery operation is necessary by referencing the stored log file information.

18. The method of claim 11, wherein each one of the at least one metadata update operations is identified by a same transaction identification (ID).

19. The method of claim 18, wherein the log file information comprises at least one of operation type, metadata update type, metadata location, changes to stored metadata, and old metadata previously stored in the device.

20. A data processing system, comprising:
a host; and
a removable storage device that receives a command from the host indicating a transaction to be executed by the removable storage device, the removable storage device comprising:
an input unit that receives at least one metadata update operation and corresponding log file information associated with the transaction;
a log information storage unit that stores the log file information before execution of the at least one metadata update operation; and
a transaction manager that controls execution of the at least one metadata update operation in the removable storage device, and execution of a recovery operation for the transaction following a failure event interrupting the transaction in accordance with the log file information stored in the log information storage unit.

* * * * *